United States Patent [19]
Bantz et al.

[11] Patent Number: 5,508,125
[45] Date of Patent: Apr. 16, 1996

[54] BATTERY STRAPS MADE OF A LEAD-BASED ALLOY CONTAINING ANTIMONY, ARSENIC, TIN AND SELENIUM

[75] Inventors: Paul E. Bantz, Colgate; Randall T. Gryczkowski, Franklin, both of Wis.

[73] Assignee: Globe-Union Inc., Milwaukee, Wis.

[21] Appl. No.: 215,223

[22] Filed: Mar. 21, 1994

[51] Int. Cl.$^6$ .................................................. H01M 2/28
[52] U.S. Cl. ...................... 429/160; 429/158; 429/161; 420/569
[58] Field of Search ..................................... 429/158, 160, 429/161; 420/569

[56] References Cited

U.S. PATENT DOCUMENTS

| | | | |
|---|---|---|---|
| 2,620,367 | 12/1952 | Brown . | |
| 3,764,386 | 10/1973 | Mix . | |
| 3,801,310 | 4/1974 | Nijhawan | 75/166 |
| 3,879,217 | 4/1975 | Peters | 135/26 |
| 3,912,537 | 10/1975 | Peters | 136/26 |
| 3,990,893 | 11/1976 | Nijhawan et al. | 75/166 |
| 3,993,480 | 11/1976 | Ueberschaer et al. | 75/166 |
| 4,159,908 | 7/1979 | Rao et al. | 75/167 |
| 4,310,353 | 1/1982 | Nann et al. | 75/166 B |
| 4,332,629 | 6/1982 | McWhinnie | 148/11.5 |
| 4,376,093 | 3/1983 | Prengaman | 420/573 |
| 4,456,579 | 6/1984 | Rao et al. | 420/566 |
| 4,753,688 | 6/1988 | Myers | 148/11.5 |
| 5,169,734 | 12/1992 | Rao et al. | 429/160 |

FOREIGN PATENT DOCUMENTS

| | | |
|---|---|---|
| 2412322 | 9/1974 | Germany . |
| 58-061565 | 4/1983 | Japan . |
| 59-208035 | 5/1984 | Japan . |
| 60-187649 | 9/1985 | Japan . |
| 61-203568 | 9/1986 | Japan . |
| 63-065041 | 3/1988 | Japan . |
| 63-226877 | 9/1988 | Japan . |
| 63-231870 | 9/1988 | Japan . |
| 63-231871 | 9/1988 | Japan . |
| 3-017955 | 1/1991 | Japan . |
| 4-002055 | 1/1992 | Japan . |

OTHER PUBLICATIONS

*The Battery Man*, Sep. 1989, article entitled "New Developments in Battery Strap Alloys," by R. David Prengaman.

*Primary Examiner*—Prince Willis, Jr.
*Assistant Examiner*—M. Nuzzolillo
*Attorney, Agent, or Firm*—Harness, Dickey & Pierce

[57] ABSTRACT

A cast strap for a lead-acid battery is made of a lead-based alloy consisting essentially of from about 2.5 to 3.5 wt. % antimony, about 0.01 to 0.5 wt. % arsenic, about 0.01 to 0.5 wt. % tin, about 0.008 to 0.1 wt. % selenium, and the balance lead. The content of at least one of arsenic, tin and selenium is within the following ranges: about 0.075 to 0.5 wt. % tin, about 0.1 to 0.5 wt. % arsenic, and 0.021 to 0.03 wt. % selenium. For lead-based alloys containing antimony, arsenic, tin and selenium, increased additions of antimony, arsenic, and selenium generally have a favorable effect on long term corrosion resistance of battery straps in a lead-acid battery environment, whereas tin has an unfavorable effect such that increased amounts of tin dramatically lower high temperature corrosion resistance. The unfavorable effects of tin on corrosion resistance are moderated by adjustment of the levels of the other three elements, particularly arsenic, which can provide a predictable level of increase in corrosion resistance for a given arsenic content. A family of alloys highly suitable for use as cast-on battery straps and intercell connectors has been developed based upon these relationships.

6 Claims, 4 Drawing Sheets

BATTERY STRAPS MADE OF A LEAD-BASED ALLOY CONTAINING ANTIMONY, ARSENIC, TIN AND SELENIUM

TECHNICAL FIELD

This invention relates to lead-based alloys used for lead-acid battery components, more particularly, to antimony-lead based alloys for cast-on battery straps.

BACKGROUND OF THE INVENTION

Lead-based alloys containing small amounts of antimony together with other elements such as arsenic and tin have been used to make grids for lead-acid batteries. See, for example, Peters U.S. Pat. No. 3,912,537, Nijhawan et al. U.S. Pat. No. 3,990,893 and Nijhawan U.S. Pat. No. 3,801,310. Lead-antimony alloys have also been used for other conductive battery components such as intercell connectors/straps, but it has been recognized that strap alloys and grid alloys have different requirements and therefore different compositions. Alloys for cast-on straps, for example, must have the ability to bond to the grid lugs during the casting process.

Lead-based alloys containing antimony and other elements have long been used to form cast-on battery straps. See, for example, Mix U.S. Pat. No. 3,764,386 and "New Developments In Battery Strap Alloys", *The Battery Man*, September 1989, p. 18. Rao et al. U.S. Pat. No. 5,169,734 describes a lead-based strap alloy consisting essentially of from about 3.0 to 3.3 wt. % antimony, about 0.04 to 0.07 wt. % arsenic, about 0.04 to 0.07 wt. % tin, and about 0.014 to 0.020 wt. % selenium. When used to make battery straps for use in lead-acid batteries, this alloy has good mechanical properties and the important ability to withstand prolonged exposure to high temperatures. The Rao et al. patent places great emphasis on the importance of the foregoing proportions, but provides no explanation as to why using each ingredient in the stated range is critical to obtaining the desired properties. The Rao et al. composition employs very low amounts of tin and arsenic, and the beneficial effects of these ingredients are correspondingly limited.

The present invention details the importance of each of antimony, tin, arsenic and selenium in a lead-based strap alloy and provides the surprising result that superior corrosion resistance can be obtained outside the narrow ranges stated in the Rao et al. patent.

SUMMARY OF THE INVENTION

It has been discovered that, for lead-based alloys containing antimony, arsenic, tin and selenium, increased additions of antimony, arsenic, and selenium generally have a favorable effect on long term corrosion resistance of battery straps in a lead-acid battery environment, whereas tin has an unfavorable effect such that increased amounts of tin dramatically lower high temperature corrosion resistance. It has also been discovered that the unfavorable effects of tin on corrosion resistance and resulting stress cracking of the strap and/or weld can be moderated by increasing the levels of the other three elements, particularly arsenic, which can provide a predictable level of increase in corrosion resistance for a given arsenic content.

A family of alloys highly suitable for use as cast-on battery straps and intercell connectors has been developed based upon these principles. Such lead-based alloys consist essentially of from about 2.5 to 3.5 wt. % antimony, about 0.01 to 0.5 wt. % arsenic, about 0.01 to 0.5 wt. % tin, about 0.008 to 0.1 wt. % selenium, and the balance lead, wherein the content of at least one of arsenic, tin and selenium is within the following ranges: about 0.075 to 0.5 wt. % tin, about 0.1 to 0.5 wt. % arsenic, and 0.021 to 0.03 wt. % selenium.

A high-tin lead-based alloy according to the invention contains from about:

2.5 to 3.5 wt. % antimony, 0.01 to 0.5 wt. % arsenic, 0.1 to 0.5 wt. % tin, and 0.008 to 0.1 wt. % selenium, the balance being essentially lead. In accordance with this aspect of the invention, it has been discovered that relatively high levels of tin can be used in alloys of this type because the amounts of Sb, As and Se can be adjusted to provide the ability to withstand a temperature of 170° F. when cycled continuously during an accelerated corrosion test.

A moderate-tin lead-based alloy according to the invention contains from about:

2.5 to 3.5 wt. % antimony, 0.01 to 0.5 wt. % arsenic, 0.075 to 0.2 wt. % tin, and 0.008 to 0.1 wt. % selenium, the balance being essentially lead. In this alloy, the amount of tin provides better fluidity to the alloy that the 0.04–0.07 wt. % Sn of Rao et al., while avoiding the corrosion increase that starts to become substantial at about 0.2 wt. % Sn, as demonstrated by the examples below.

A high-arsenic lead-based alloy according to the invention contains from about:

2.5 to 3.5 wt. % antimony, 0.1 to 0.5 wt. % arsenic, 0.04 to 0.5 wt. % tin, and 0.008 to 0.1 wt. % selenium, the balance being essentially lead. In accordance with this embodiment, it has been found that maintaining an arsenic content of at least about 0.1 wt. % has a favorable effect on corrosion resistance and lessens the corrosion promoting effects of tin, especially at tin levels of about 0.2 wt. % or above.

A high-selenium lead-based alloy according to the invention contains from about:

2.5 to 3.5 wt. % antimony, 0.01 to 0.5 wt. % arsenic, 0.01 to 0.5 wt. % tin, and 0.021 to 0.1 wt. % selenium, the balance being essentially lead. In contrast to the findings of the Rao et al. patent discussed above, it has been found that amounts of selenium above 0.020 wt. % generally provide better corrosion resistance and impart other desirable properties to the alloy as discussed further below.

The present invention further provides battery components, particularly cast-on battery straps, made of the alloy according to the invention. These and other aspects of the invention are described in detail hereafter. In the description which follows, use of the words "preferred" or "preferably" does not necessarily mean that a stated amount range lacks criticality for one or more purposes. While a broad range may satisfy the general objectives of the invention in providing an alloy useful in battery components such as straps, a preferred range will often set forth the range in which an unexpected improvement in properties is obtained. Similarly, for purposes of the invention, the word "about" when used in connection with numerical ranges means that amounts close to but not literally within the numerical range should nonetheless be considered within the range. For example, 3.251 is about 3.25, and 0.0209 is about 0.021. Ranges expressed herein refer to the alloy prior to casting, during which some loss of volatile elements can occur.

DETAILED DESCRIPTION OF PREFERRED EMBODIMENTS

Figure 1:
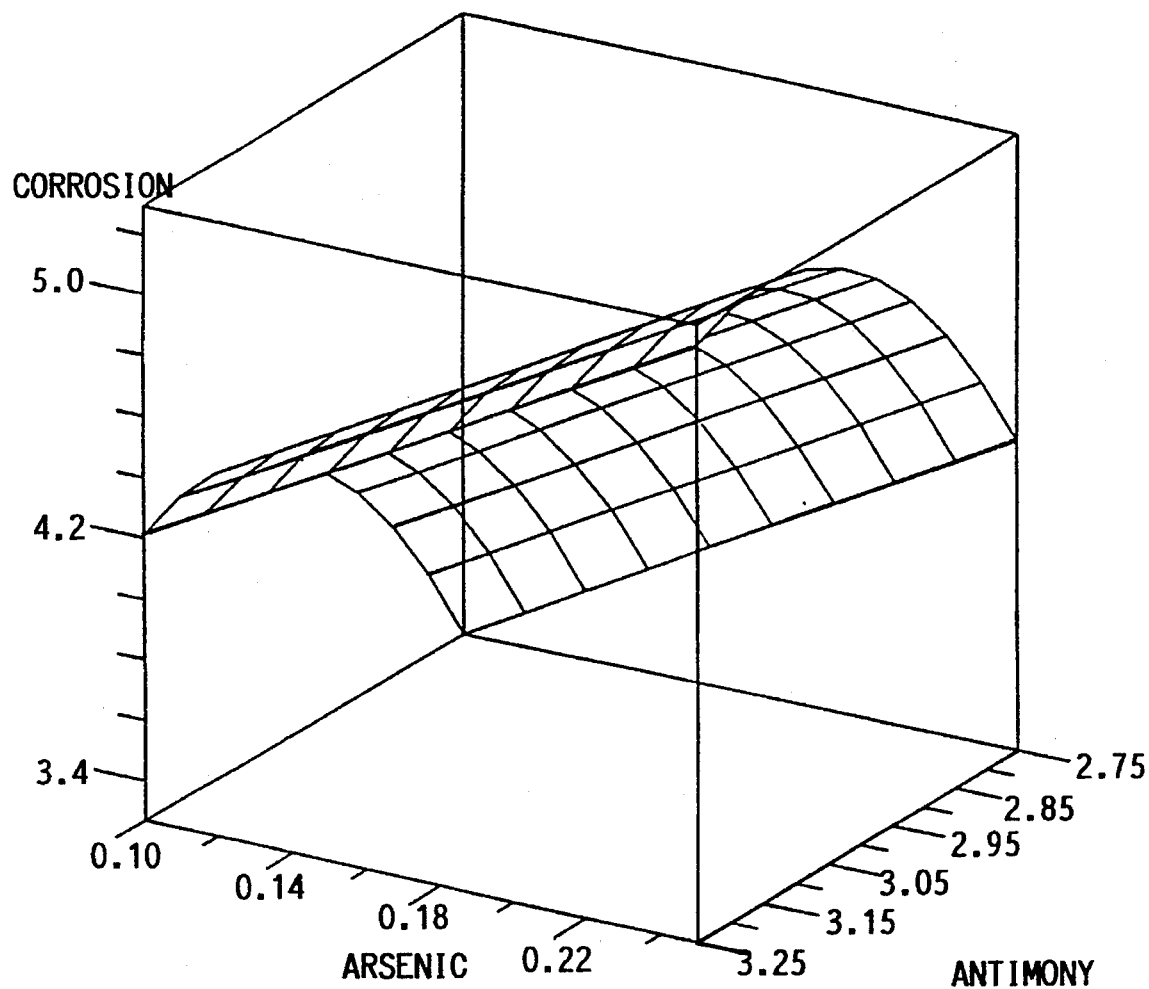
FIG. 1 is a three-dimensional plot of arsenic content (wt. %) and antimony content (wt. %) versus corrosion resistance for a model containing 0.18 wt. % tin, 0.016 wt. % selenium, and the balance lead.

Alloys of the invention having antimony, arsenic, tin and selenium in the above stated ranges are designed to achieve an alloy which can resist corrosion during continuous exposure to high temperatures, i.e., 155° F. in an SLI (starting, lighting and ignition) lead-acid battery for long periods without corroding to the point where cracking of the strap and/or weld occurs, breaking the electrical connection within the battery. The alloy must also have sufficient mechanical strength to be useful as a battery strap. For purposes of the invention, "strap" refers to an elongated connector that is secured on the lugs of the positive plates of a battery cell, extends through or over the non-conductive cell partition wall, and is secured to the lugs of negative plates of the next adjacent cell. For the first and last cells in the series, the strap connects to either the positive or negative terminal. Such straps are commonly provided by casting the strap alloy through a hole near the top of each plastic cell partition wall. For a conventional SLI strap arrangement, see Rao et al.

U.S. Pat. No. 5,169,734, the contents of which are incorporated herein by reference.

According to the invention, antimony is provided at a level at or near 3 wt. % in order to provide the alloy with strength and good fusion characteristics. However, antimony in excess of about 3.25 wt. %, especially 3.5 wt. %, results in a gradual decrease in corrosion resistance in the alloy. Insufficient antimony (less than 2.75 wt. %, especially less than 2.5 wt. %) will not provide adequate strength for a high performance battery strap.

Arsenic accelerates age hardening of the alloy and, as demonstrated below, increases corrosion resistance. A minimum amount of 0.01 wt. % is needed to achieve these effects, and the minimum must be at least about 0.1 wt. % if arsenic is needed to provide improved anti-corrosion effects. However, arsenic is highly toxic and can become volatilized during the casting process, forming toxic fumes. Arsenic can also lower the impact and tensile strength of the alloy when used in amounts above about 0.25–0.5 wt. %. The amount thereof is therefore preferably limited to 0.5 wt. % or less, especially to a lesser amount as needed to achieve the properties desired.

Tin enhances the fluidity of the alloy and thus enhances castability. Very low tin alloys (less than about 0.07 wt. %) can cause problems during strap casting, namely drossing (oxidation) of the lead alloy. A minimum amount which may lie in the range of 0.01–0.04 wt. % Sn is needed to provide any improvement in castability, and tin even be omitted from the high-arsenic and high-selenium embodiments of the invention if castability is otherwise determined to be adequate. However, as noted above, tin also has a detrimental effect on corrosion resistance at levels of about 0.2 wt. % and above, and the effect becomes excessive at levels above 0.5 wt. %.

Selenium is used as a grain refiner and has been found to improve high temperature corrosion resistance at levels up to and exceeding 0.021 wt. %. Without at least about 0.008 wt. % selenium, the alloy has a large grain structure that fails rapidly in a high-temperature SLI battery environment. Beyond about 0.1 wt. %, the selenium addition has a detrimental effect on both corrosion resistance and mechanical properties of the alloy and the amount added will generally exceed the solubility limit of selenium in the lead-based alloy.

Alloys of the invention should be free of other elements that would interfere with the balance of properties obtained in the alloy. In particular, sulfur interferes with the effect of selenium and is preferably limited to 0.008 wt. % or less, especially 0.001 wt. % or less. Trace impurities and addition of other elements that do not significantly affect the Pb-Sb-As-Sn-Se system, such as bismuth in amounts of up to about 0.5 wt. % or copper in an amount of up to 0.05 wt. %, are permissible.

The high-tin/high-arsenic lead-based alloys according to the invention preferably contain from about:

2.75 to 3.25 wt. % antimony, 0.1 to 0.5 wt. % arsenic, 0.1 to 0.25 wt. % tin, and 0.008 to 0.03 wt. % selenium, the balance being essentially lead. In accordance with this aspect of the invention, it has been discovered that the corrosion-promoting effects of tin levels in the foregoing subrange can be effectively controlled by maintaining a corresponding arsenic content. In particular, when the tin content is less than about 0.2 wt. %, no prescribed level of arsenic higher than 0.1 wt. % is required. However, when the tin content is about 0.2 wt. % or higher, the arsenic content is preferably at least about equal to the tin content, and is most advantageously greater than the tin content by an amount of at least 0.02 additional wt. % arsenic for each 0.01 wt. % of tin above 0.2 wt. %. For example, at 0.21 wt. % tin, arsenic is at least 0.22 wt. %, and at 0.22 wt. % tin, arsenic is at least 0.24 wt. %. Maintaining this proportion will provide a strap capable of withstanding continuous exposure to a temperature of at least 170° F. for at least six weeks (score of 4 or higher on the scale used in FIG. 2; see below) when cycled continuously during an accelerated corrosion test. Maintaining the arsenic content at least equal to the tin content when Sn>0.2 wt % will provide a strap capable of withstanding continuous exposure to the accelerated corrosion conditions for at least four weeks (score of 3 or higher on the scale used in the drawing figures).

A preferred moderate-tin lead-based alloy according to the invention contains from about:

2.75 to 3.25 wt. % antimony, 0.01 to 0.5 wt. % arsenic, 0.1 to 0.2 wt. % tin, and 0.008 to 0.03 wt. % selenium, the balance being essentially lead. In this alloy, the amount of arsenic is less critical because the amount of tin is held within a range where its corrosion effects are limited, particularly if a range of about 3.0–3.25 Sb is employed.

A preferred high-selenium lead-based alloy according to the invention contains from about:

2.75 to 3.25 wt. % antimony 0.01 to 0.3 wt. % arsenic 0.01 to 0.25 wt. % tin, and 0.021 to 0.1 wt. % selenium, the balance being essentially lead. In view of solubility concerns and a slight lowering of corrosion resistance at high selenium levels, a range of 0.021 to 0.03 wt. % Se, particularly 0.021 to 0.024 wt. % Se, is most preferred for these alloys. For the reasons discussed above, a high selenium alloy of 2.75 to 3.25 wt. % antimony, 0.1 to 0.3 wt. % arsenic, 0.1 to 0.25 wt. % tin, and 0.021 to 0.03 wt. % Se and the balance essentially Pb is most preferred.

In summary, the rate of high temperature accelerated corrosion in an SLI battery strap made of a lead-based alloy containing around 3 wt. % antimony depends mainly on both the weight percent of tin in the alloy and the ratio of arsenic to tin in the alloy. Tin content has a main effect on stress cracking, and its content should therefore be kept as low as feasible. Arsenic needs to be as high as possible from the point of view of preventing corrosion, but is limited by health and safety concerns; an upper limit of about 0.3 wt. % As for all of the arsenic ranges described above is preferred for these reasons.

Automotive SLI batteries are well known. Such a battery includes a container, generally of molded polypropylene, having a plurality of cells and a sulfuric acid electrolyte contained in the cells. Each cell has a plurality of positive and negative electrodes disposed therein comprising a grid supporting structure having a layer of lead active material attached thereto, with separators interposed between pairs of positive and negative plates. Lead alloy straps running over the top of the stacked battery plates in each cell connect the respective positive and negative electrodes together. The strap includes an intercell connection, that is, a portion which penetrates or extends over the partition between cells to connect the cells in series. In a sealed or recombinant lead-acid battery, oxygen and hydrogen gases generated as a result of the electrochemical reactions are recombined during cycling to prevent loss of electrolyte. In an improved SLI battery according to the invention, particularly a recombinant lead-acid battery, the straps are formed of one of the foregoing lead-based alloys consisting essentially of antimony, tin, arsenic and selenium.

The general nature of the invention having been set forth, the following examples are presented as illustrations thereof. It will be understood that the invention is not limited to these specific examples, but is susceptible to various modifications that will be recognized to those of ordinary skill in the art.

EXAMPLES

An experiment was constructed to evaluate alloy corrosion and weld stress cracking based on an accelerated corrosion test. The central composite-centerpoint design contained four factors (antimony, arsenic, tin and selenium) at three levels. Element ranges were: antimony (2.50% to 3.50%), arsenic (0.025% to 0.325%), tin (0.025% to 0.325%) and selenium (0 to 0.032%). Thirty-one alloys were prepared having the compositions set forth in the alloy table below. Three replicates of each alloy were prepared for the corrosion test, allowing samples to be removed from the test fixture at four, six and eight weeks. Additional weld samples were prepared for mechanical testing and metallography. A comparative prior art alloy was included as a standard. This alloy contained approximately 3 wt. % antimony, 0.125 wt. % arsenic, 0.275 wt. % tin, 0.05 wt. % copper, and 0.0055 wt. % sulfur. Samples of the test alloys were submitted for tensile and impact testing.

An accelerated corrosion test was carried out as follows. In accordance with well-known casting methods, samples of each lead alloy were heated to a temperature in the range of 850°–950° F. and gravity-cast into a mold. The cast battery straps were joined by welding through a hole in a polypropylene partition. The resulting strap-weld assemblies were cycled at 170° F. in a sulfuric acid electrolyte and examined periodically for evidence of corrosion. The selected temperature of 170° F. is higher than the normal under-hood temperatures and thus provided an accelerated aging test that correlates well with battery life in actual use.

Photomicrographs were prepared for initial samples and samples removed from corrosion fixtures at four, six, and eight weeks. A ranking system was determined using one point for each two weeks completed without stress cracking. A sample that corroded and failed within the first week received a score of 1. Passing two weeks rated a 2, passing four weeks rated 3, passing six weeks rated 4, and a sample that completed eight weeks under the test conditions intact was assigned a score of 5. Samples were ranked by visual inspection for corrosion. Welds that completed each corrosion period without complete cracking were given full credit for that period.

The sample compositions and results were as follows (NM=not measured):

| | | ALLOY TABLE | | | | | |
|---|---|---|---|---|---|---|---|
| Sample | Sb | Ar | Sn | Be | Rank | Impact Str. | Tens. Str. |
| 1 | 3.00 | 0.175 | 0.175 | 0.016 | 4.6 | 99 | 111 |
| 2 | 3.00 | 0.175 | 0.175 | 0.032 | 5 | 267 | 276 |
| 3 | 2.75 | 0.100 | 0.100 | 0.008 | 3.5 | NM | 73.5 |
| 4 | 3.25 | 0.250 | 0.250 | 0.024 | 4.1 | 84 | 81 |
| 5 | 3.00 | 0.175 | 0.325 | 0.016 | 1 | 147 | 116 |
| 6 | 3.25 | 0.250 | 0.250 | 0.008 | 3.5 | 80 | 82 |
| 7 | 3.00 | 0.175 | 0.175 | 0.016 | 5 | 95 | 116 |
| 8 | 2.75 | 0.100 | 0.250 | 0.024 | 1.8 | 271 | 271 |
| 9 | 2.75 | 0.100 | 0.250 | 0.008 | 1.5 | 81 | 57 |
| 10 | 3.00 | 0.175 | 0.025 | 0.016 | 4.2 | 198 | 176 |
| 11 | 3.00 | 0.175 | 0.175 | 0.016 | 5 | 113 | 119 |
| 12 | 2.75 | 0.250 | 0.250 | 0.024 | 3.5 | 90 | 105 |
| 13 | 2.75 | 0.250 | 0.250 | 0.008 | 2 | 73 | 83 |
| 14 | 3.00 | 0.175 | 0.175 | 0.000 | 1.6 | 20 | 20 |
| 15 | 3.25 | 0.100 | 0.250 | 0.024 | 2 | 282 | 205 |
| 16 | 2.75 | 0.100 | 0.100 | 0.024 | 4.7 | 238 | 225 |
| 17 | 2.50 | 0.175 | 0.175 | 0.016 | 1 | 76 | 65 |
| 18 | 3.25 | 0.100 | 0.250 | 0.008 | 1 | 81 | 65 |
| 19 | 2.75 | 0.250 | 0.100 | 0.008 | 5 | 73 | 84 |
| 20 | 3.25 | 0.100 | 0.100 | 0.024 | 5 | 160 | 143 |
| 21 | 3.00 | 0.175 | 0.175 | 0.016 | 5 | 119 | 134 |
| 22 | 3.00 | 0.025 | 0.175 | 0.016 | 3 | NM | 146 |
| 23 | 3.25 | 0.250 | 0.100 | 0.024 | 4.8 | 128 | 112 |
| 24 | 2.75 | 0.250 | 0.100 | 0.024 | 4.7 | 92 | 110 |
| 25 | 3.00 | 0.325 | 0.175 | 0.016 | 4.9 | 136 | 167 |
| 26 | 3.00 | 0.175 | 0.175 | 0.016 | 4.9 | 147 | 124 |
| 27 | 3.25 | 0.250 | 0.100 | 0.008 | 4.8 | 81 | 81 |

ALLOY TABLE -continued

| Sample | Sb | Ar | Sn | Be | Rank | Impact Str. | Tens. Str. |
|---|---|---|---|---|---|---|---|
| 28 | 3.00 | 0.175 | 0.175 | 0.016 | 4.8 | 143 | 124 |
| 29 | 3.50 | 0.175 | 0.175 | 0.016 | 5 | 119 | 168 |
| 30 | 3.00 | 0.175 | 0.175 | 0.016 | 4.8 | 97 | 137 |
| 31 | 3.25 | 0.100 | 0.100 | 0.008 | 4.8 | 80 | 82 |

The standard weld using the known alloy was rated at 3.3 out of 5. This compares favorably to a selenium alloy with the same antimony, arsenic and tin composition. The general trend indicates that the selenium alloys produce more surface corrosion than the larger grained sulfur refined alloys and are very dependent on tin and arsenic content to resist stress cracking.

The results of this test were used to produce a model that fitted the data. FIGS. 1 through 4 were prepared using the test data to determine the effects of varying each of the alloy components within the range of the experiment. FIG. 1 shows that, with tin and selenium held constant at appropriate levels, antimony provides maximum corrosion resistance at a level slightly above 3 wt. %, particularly from 3.05 to 3.15 wt. %. However, depending on the content of the other ingredients, and particularly when the arsenic content was relatively high (0.2 wt. % or more) an antimony content under 3 wt. % also produced superior results. All of the tested samples were comparable to or better than the corrosion rating of the conventional alloy.

Figure 2:
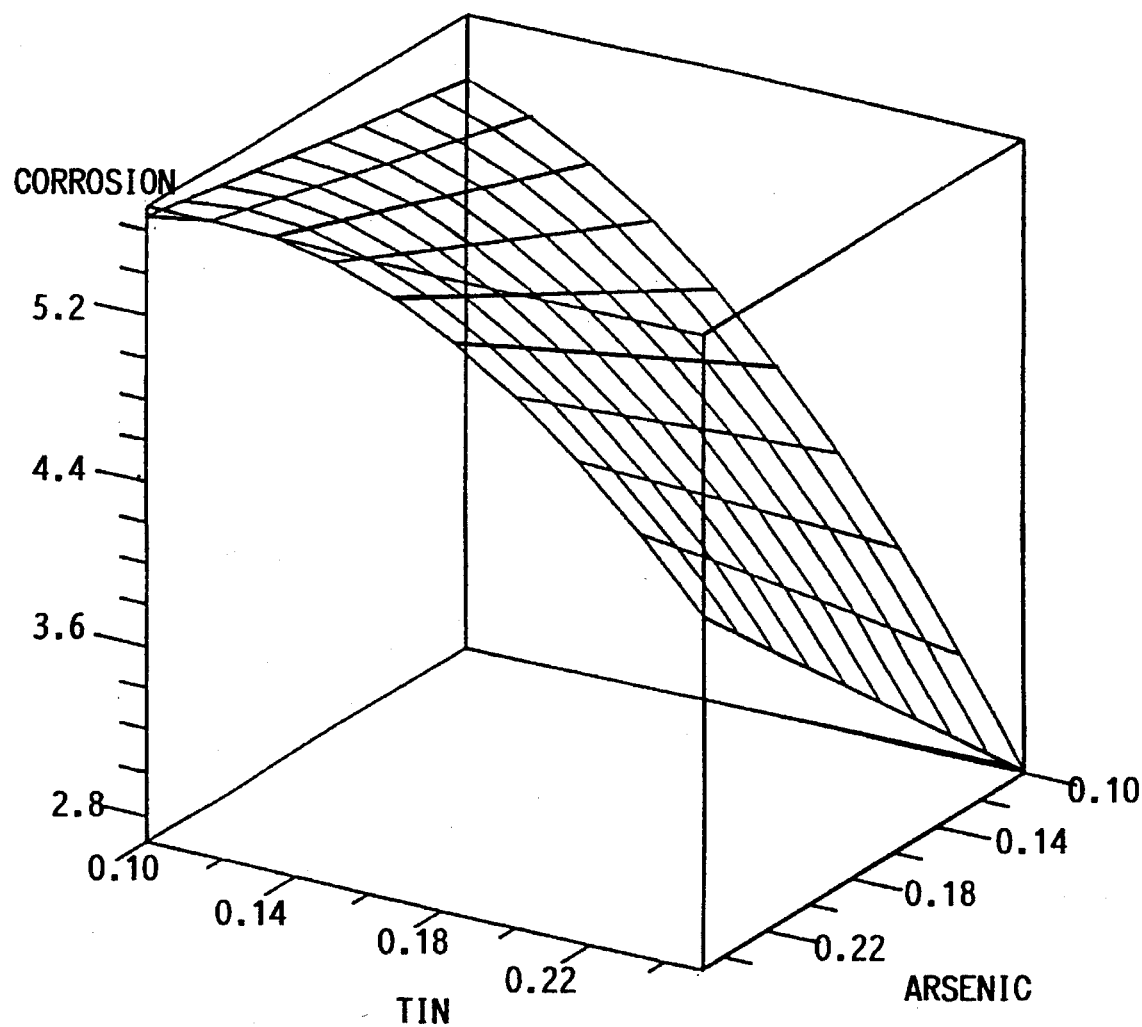
FIG. 2 is a three-dimensional plot of tin content (wt. %) and arsenic content (wt. %) versus corrosion resistance for a model containing 3.106 wt. % antimony, 0.020 wt. % selenium, and the balance lead.
Figure 3:
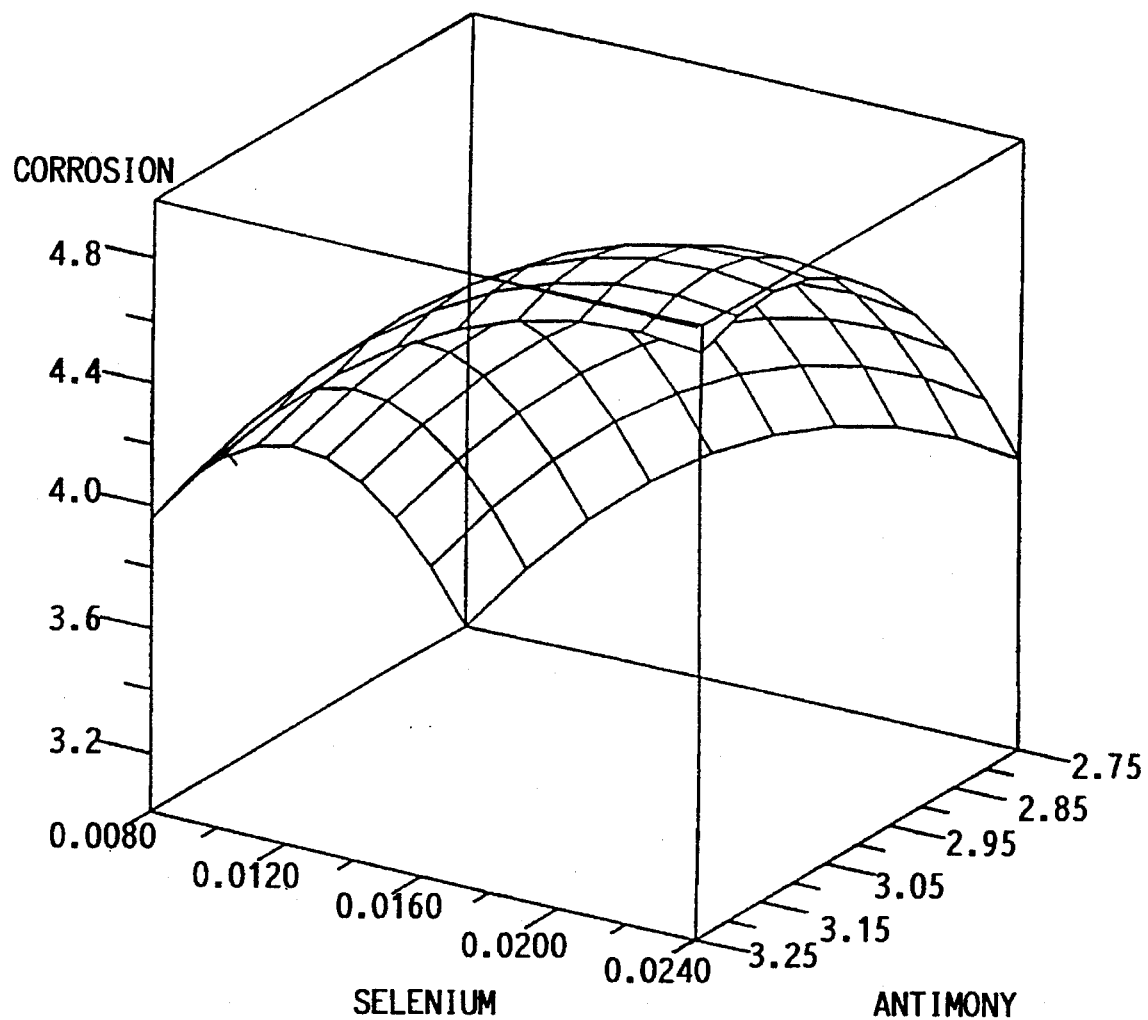
FIG. 3 is a three-dimensional plot of selenium content (wt. %) and antimony content (wt. %) versus corrosion resistance for a model containing 0.18 wt. % tin, 0.18 wt. % arsenic, and the balance lead.

FIG. 2 shows that tin content has the greatest effect on corrosion. Larger amounts of tin dramatically lowered corrosion resistance, but the effect could be greatly moderated by increasing the level of arsenic.

FIG. 3 again shows that antimony provides maximum corrosion resistance at a level slightly above 3 wt. %. Selenium additions increased corrosion resistance up to a maximum that was reached between 0.021 and 0.022 wt. %, with a slight decline evident at 0.024 wt. % Se.

Figure 4:
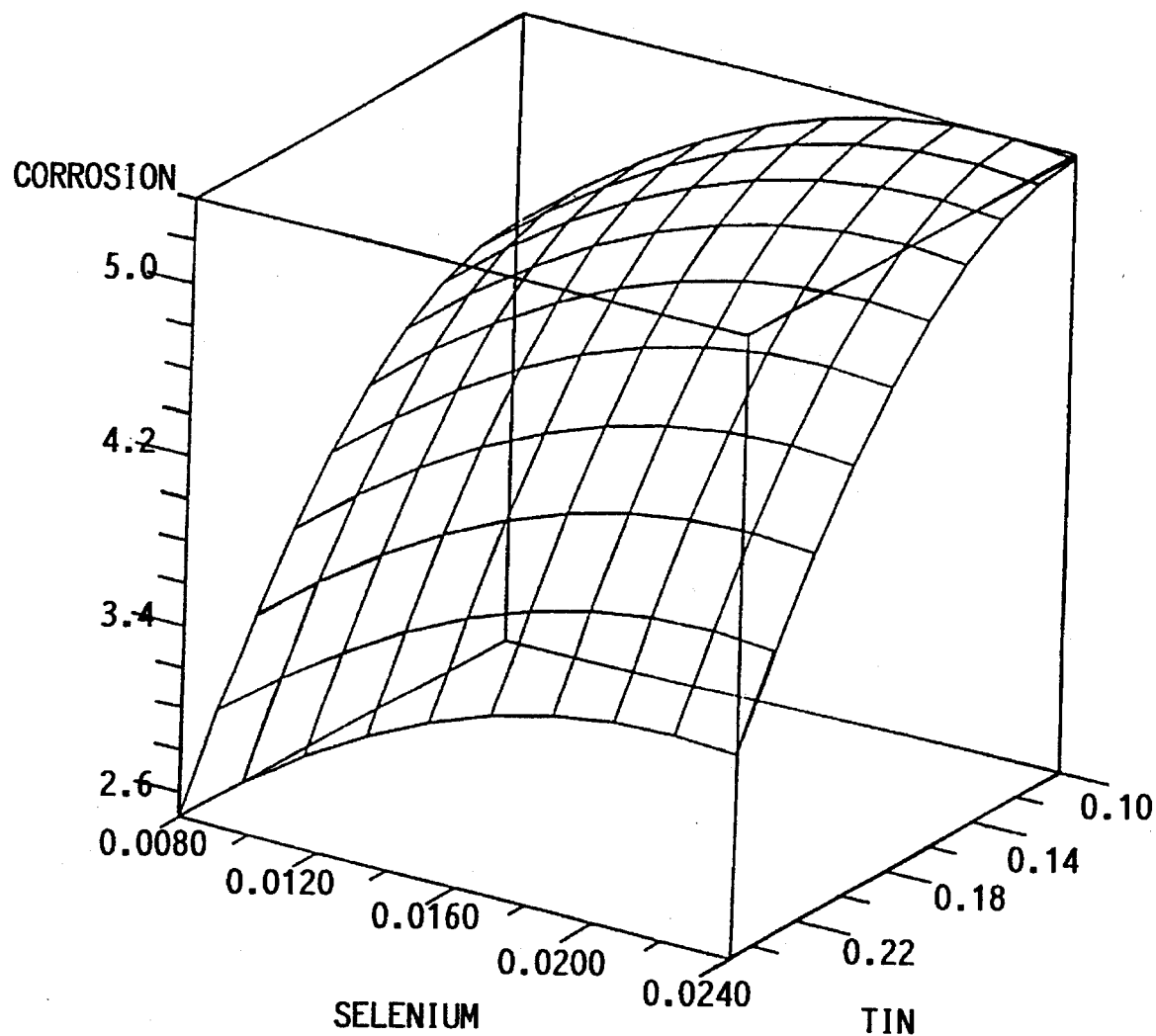
FIG. 4 is a three-dimensional plot of selenium content (wt. %) and tin content (wt. %) versus corrosion resistance for a model containing 3.0 wt. % antimony, 0.18 wt. % arsenic, and the balance lead.

FIG. 4 shows the dramatic effect of increased tin content as lowering corrosion resistance and the corrosion resistance-enhancing effects of selenium up to 0.020–0.022 wt. % Se. Selenium increases were not as effective as arsenic increases at reducing the corrosive effect of tin.

Overall, the test results as shown in FIGS. 1 to 4 indicate that arsenic and selenium have a positive effect on corrosion resistance, i.e., increasing the content of either or both elements increases corrosion resistance more or less linearly. For selenium, the effect is seen from zero up to a maximum of 0.02 wt. % selenium, and for arsenic there appears to be no upper limit to the effect. Antimony addition likewise increases corrosion resistance up to a maximum at just above 3 wt. % Sb. Tin, on the other hand, lowers corrosion at a faster-than-linear rate.

Effects were also noted for arsenic and selenium with respect to impact and tensile strength. Small increases in selenium content resulted in large increases in impact and tensile strengths. For selenium, the largest increases occurred for selenium contents exceeding 0.02 wt. %, particularly from 0.024 to 0.032 wt. % Se. By contrast, larger amounts of arsenic (0.25 wt. % or more) lowered impact and tensile strength even when selenium levels were high.

It will be understood that the above description is of preferred exemplary embodiments of the invention, and that the invention is not limited to the specific forms shown. Modifications may be made in the specific illustrations described herein without departing from the scope of the present invention as expressed in the appended claims.

We claim:

1. A cast battery strap for a lead-acid battery, which strap is made of a lead-based alloy consisting essentially of from about 2.5 to 3.5 wt. % antimony, about 0.01 to 0.5 wt. % arsenic, about 0.1 to 0.5 wt. % tin, about 0.008 to 0.1 wt. % selenium, and the balance lead, provided that if the tin content is 0.2 wt. % or higher, the arsenic content is at least about equal to the tin content.

2. The strap of claim 1, wherein the lead-based alloy consists essentially of about 2.75 to 3.25 wt. % antimony, about 0.1 to 0.5 wt. % arsenic, about 0.1 to 0.25 wt. % tin, and about 0.008 to 0.03 wt. % selenium, the balance being lead.

3. The strap of claim 1, wherein the tin content is 0.2 wt. % or higher.

4. The strap of claim 1, wherein the tin content is 0.2 wt. % or higher, and the arsenic content is greater than the tin content by an amount of at least 0.02 additional wt. % arsenic for each 0.01 wt. % of tin above 0.2 wt. %.

5. A cast battery strap for a lead-acid battery, which strap is made of a lead-based alloy consisting essentially of from about 2.75 to 3.25 wt. % antimony, 0.01 to 0.5 wt. % arsenic, 0.1 to 0.2 wt. % tin, 0.008 to 0.03 wt. % selenium, and the balance lead.

6. A cast battery strap for a lead-acid battery, which strap is made of a lead-based alloy consisting essentially of from about 2.75 to 3.25 wt. % antimony, about 0.1 to 0.5 wt. % arsenic, about 0.1 to 0.25 wt. % tin, and about 0.008 to 0.03 wt. % selenium, the balance being lead.

* * * * *